3,112,322
SEPARATION OF HETEROCYCLIC AMINES

Peter Fotis, Highland, Ind., and Ellis K. Fields, Chicago, Ill., assignors to Standard Oil Company, Chicago, Ill., a corporation of Indiana
No Drawing. Filed Nov. 6, 1959, Ser. No. 851,220
4 Claims. (Cl. 260—283)

This invention relates to the separation of isomers of substituted organic cyclic compounds and especially isomers of substituted nitrogen heterocyclic amino compounds. More particularly this invention relates to the separation of isomers of alkyl and aryl substituted pyridine and quinoline compounds.

Isomers of organic cyclic componds and particularly substituted nitrogen-containing heterocyclic amino compounds are generally difficult to separate because of their close boiling points and their common affinity for given solvents. Often, only one isomer is useful for a desired purpose and must be separated from other isomers. For example, lower alkyl pyridine isomers may be oxidized to the corresponding acids which are individually useful in pharmaceutical applications. Because it is often desirable to use isomers of such acids in relatively pure form, it is important to separate either the starting material or the acid product. For example, oxidations of 3-methyl and 4-methyl pyridines give nicotinic and isonicotinic acids respectively. The value of each of these acids as a pharmaceutical intermediate is increased if each acid is not appreciably contaminated with the other isomer. The simplest way to obtain a pure acid isomer is to oxidize the pure corresponding starting material. However, the physical properties of the various isomers of the starting material are often so similar that separation by physical means is impractical.

In accordance with this invention we have provided a separation process for separating the isomers of substituted organic cyclic compounds such as aromatic and heterocyclic acids and hydrocarbon substituted compounds and particularly the nitrogen containing heterocyclic amino compounds. Accordingly, the isomers are separated by forming separable complexes with an inorganic alkali halide. The complexes may then be separated by physical means. The complex with one or more of the isomers is formed by treating a mixture of isomers with the inorganic alkali halide. The complex is then separated from the treated mixture and the isomer or isomers are freed from the complex. In this manner isomers of nitrogen-containing heterocyclic amino compounds, especially those containing a methyl pyridine nucleus, are separated in accordance herewith. Of course, it is fully intended that isomers of nitrogen-containing heterocyclic amino compounds may also be separated from admixture with other organic components, and particularly other nitrogen-containing heterocyclic amino compounds.

The treating with the inorganic alkali halide in accordance with this invention is accomplished by admixing the inorganic alkali halide with the mixture of isomer to be separated at a temperature below the decomposition temperature of the complex formed with the isomer during treatment. Any temperature below the decomposition temperature of the complex apparently can be used without adversely affecting the complex formation. Better yield and purity are obtained at lower temperatures and, therefore, we prefer to carry out the treating at a temperature in the economical and practical range of from about 25° C. to about 140° C. The treating is carried out for a period of time sufficient to form the desired complex. Normally from 15 to 30 minutes will be sufficient; however, treating times up to about 20 hours or more may advantageously be used. After the complex has been formed the complex is then separated from the treated mixture as more particularly described hereinbelow. The separated complex may be washed with a solvent such as hexane, heptane, benzene, isooctane, and the like to remove impurities. The complex is then decomposed by contacting it with water or other suitable solvents for the inorganic alkali halide. The isomer is thereby substantially freed from the inorganic alkali halide complex and may then be extracted with a suitable solvent such as paraffinic and aromatic hydrocarbons, e.g. pentane, hexane, benzene, toluene, etc., and water-insoluble ethers. The solvent extract may be dried and then distilled to recover the complexed isomer as a residue. In another embodiment, the complex may be decomposed by heating above the decomposition temperature of the complex and recovering the complexed isomer overhead and leaving the inorganic alkali halide as a residue.

The isomers of substituted nitrogen-containing heterocyclic amino compounds may advantageously be isomers of compounds having a methyl pyridine nucleus, such as alkyl and aryl substituted pyridine and quinoline compounds. Preferably, the alkyl groups contain from about 1 to about 10 carbon atoms, the aryl group contains from about 6 to about 10 carbon atoms; and there are preferably from about 1 to about 3 total aryl and alkyl groups attached to each heterocyclic nucleus. Particular examples of such compounds are the picolines, the lutidines, methyl quinolines, trimethyl pyridines, dimethyl quinolines, and trimethyl quinolines. The present process is particularly useful in the preferred embodiment for separating isomers of methyl pyridine, isomers of dimethyl pyridine and isomers of methyl quinoline.

The inorganic alkali halides useable in accordance herewith are the chlorides, bromides, and the iodides of lithium; lithium bromide is particularly preferred. The inorganic alkali halides are preferably added to the mixtures of isomers as salts, although they may also be added as a solution in a solvent as a complex with an organic acid or with an organic base, or in some other like manner. When the inorganic alkali halides are used in a solvent it is preferred that they be used in almost saturating concentrations and it is further preferred that the solvent be a removeable solvent. The removeable solvents are those solvents which may be removed from the isomer mixture such as by evaporation. In treating the mixture of isomers it is advantageous to use no more than about ½ mole of inorganic alkali halide per mole of mixed isomers because additional amounts of the halide do not increase the amount of complex formation sufficiently to justify their use. We prefer to use one mole of the inorganic alkali halide for each 3 to 10 moles of feed.

The complexed isomers may be separated from each other, or one complexed isomer may be separated from a mixture, by methods known to the art. In some separations, such as in the separation of isomers of picolines and lutidines one complexed isomer will precipitate from the treated mixture while the other complexed isomer is soluble in the mixture; in such cases the separation is achieved by simple filtration. Where all complexes formed are soluble in the mixture of isomers, one or more isomer complexes may be precipitated by adding the treated mixture of isomers to a precipitating solvent to precipitate one complex, or the mixture of soluble isomers may be extracted with extraneous solvents. Further, mixtures of soluble complexes may be separated by azeotropic distillation or by fractional distillation. Where two or more complexes with isomers are solids, they may often be separated from each other by differences in melting points or by extraction with solvents. Other means of separating the complexed isomers will be apparent to those skilled in the art.

A solvent may be employed with the inorganic alkali halide during the treating of the isomer mixture to solubilize or precipitate one or more complexed isomers and thereby assist in the separation. The solvents useable for this purpose are water and the low molecular weight oxygen containing solvents such as alcohols and ketones. The preferred solvent is water.

The following examples illustrate the separation of isomers in accordance with this invention using the alkali metal complexing treatment set out above.

EXAMPLE 1

As an illustration of the separation of methyl pyridine isomers, 5.0 g. of dried lithium bromide and 50 ml. of a 50–50 feed mixture of beta-picoline and gamma-picoline were added to a 250 ml. stoppered flask. The mixture of lithium bromide and picoline was stirred and allowed to stand for 18 hours. A precipitated complex was formed and was removed by filtration. 10 ml. of water were added to decompose the complex in the solid precipitate and the water layer was extracted with ether. The ether solution was then dried over potassium hydroxide and distilled to leave the complexed isomer as a 19 ml. residue product. Infrared spectrophotometer analysis of the complexed isomer residue product was as follows:

| $\beta$-picoline, Mol. Percent | $\gamma$-picoline, Mol. Percent |
|---|---|
| [1] 85 | [1] 15 |

[1] Corrected for ether content of total residue.

EXAMPLE 2

As an illustration of the use of a greater relative amount of lithium bromide, 8.8 g. (0.1 mole) of dried lithium bromide and 50 ml. (0.515 mole) of a 50–50 feed mixture of beta-picoline and gamma-picoline were added to a 250 ml. stoppered flask. The mixture of lithium bromide and picolines was stirred and allowed to stand overnight. A precipitate complex was formed and was removed by filtration. 10 ml. of water were added to decompose the complex in the solid precipitate and the water layer was extracted with ether. The ether solution was then dried over potassium hydroxide and distilled to leave the complexed isomer as a 24 ml. residue product. Semi-quantitative analysis of the residue product for $\beta$-picoline and $\gamma$-picoline was as follows:

| $\beta$-picoline, Mol. Percent | $\gamma$-picoline, Mol. Percent |
|---|---|
| 78±4 | 22±2 |

EXAMPLE 3

As an illustration of a shorter contacting time period, 4.4 g. (0.5 mole) of dried lithium bromide and 50 ml. (0.515 mole) of a 50–50 mixture of beta-picoline and gamma-picoline were added to a 250 ml. stoppered flask. The mixture of lithium bromide and picolines was warmed slightly, stirred and allowed to stand for 1 hour. A precipitate was formed and was removed by filtration. The precipitated solid complex weighed 17 g. Ten ml. of water were added to decompose the complex in the solid precipitate and the water layer was extracted with ether. The ether solution was then dried over potassium hydroxide and distilled to leave the complexed isomer as a 14 ml. residue product. The filtrate was distilled under vacuum at room temperature to decompose any complexes formed and separate lithium bromide as a bottoms. 34 ml. of distillate were recovered. Infrared spectrophotomatic analyses of the feed, residue product and distillate were as follows:

| | $\beta$-picoline, Mol. Percent | $\gamma$-picoline, Mol. Percent |
|---|---|---|
| Feed | 49 | 51 |
| Residue product | 75 | 23 |
| Distillate | 37 | 62 |

$\beta$-value for the separation was 5.1.

EXAMPLE 4

As another illustration, 8.7 g. (0.1 mole) of dried lithium bromide and 50 ml. (0.515 mole) of a 50–50 mixture of beta-picoline and gamma-picoline were added to a 250 ml. stoppered flask. The mixture of lithium bromide and picolines was warmed slightly stirred and allowed to stand for 1 hour. A precipitate was formed and was removed by filtration. The precipitate weighed 28.2 g. Ten ml. of water were added to decompose the complex in the solid precipitate and the water layer was extracted with ether. The ether solution was then dried over potassium hydroxide and distilled to leave the complexed isomer as a 21 ml. residue product. The filtrate was distilled under vacuum at room temperature to decompose any complexes remaining in the filtrate and to separate lithium bromide as a bottoms. 25 ml. of distillate were recovered. Infrared spectrophotometer analyses of the feed residue product and distillate were as follows:

| | $\beta$-picoline, Mol. Percent | $\gamma$-picoline, Mol. Percent |
|---|---|---|
| Feed | 49 | 51 |
| Residue product | 79 | 21 |
| Distillate | 22 | 77 |

$\beta$-value for the separation was 13.

EXAMPLE 5

As still another illustration, 8.7 g. (0.1 mole) of dried lithium bromide and 50 ml. (0.515 mole) of a 50–50 mixture of beta-picoline and gamma-picoline were added to a 250 ml. stoppered flask. The mixture of lithium bromide and picolines was warmed slightly stirred and allowed to stand for 5 hours. A precipitate was formed and was removed by filtration. The precipitate weighed 27.7 g. Ten ml. of water were added to decompose the complex in the solid precipitate and the water layer was extracted with ether. The ether solution was then dried over potassium hydroxide and distilled to leave the complexed iosmer as a 21 ml. residue product. The filtrate was distilled under vacuum at room temperature to decompose any complexes formed and to separate lithium bromide out as a bottoms. 23 ml. of distillate were recovered. Infrared spectrophotometer analyses of the feed, residue product and distillate were as follows:

| | $\beta$-picoline, Mol. Percent | $\gamma$-picoline, Mol. Percent |
|---|---|---|
| Feed | 49 | 51 |
| Residue product | 81 | 19 |
| Distillate | 18 | 82 |

$\beta$-value for the separation was 18.8.

EXAMPLE 6

As an illustration of lower temperatures during separation, 8.7 g. (0.1 mole) of dried lithium bromide were placed in a 250 ml. flask and cooled to 5° C. 50 ml. (0.515 mole) of a 50–50 mixture of beta-picoline and gamma-picoline were added to the flask and the flask was then stoppered. The mixture of lithium bromide and picolines was cooled to 5° C., stirred, and allowed to stand for 1 hour at 5° C. A precipitate was formed and was removed by filtration and washed with about 25 ml.

n-hexane. 10 ml. of water were added to decompose the complex in the solid precipitate and the water layer was extracted with ether. The ether solution was then dried over potassium hydroxide and distilled to leave the complexed isomer as a 22 ml. residue product. Infrared spectrophotometer analysis of the residue product was as follows:

| β-picoline, Mol. Percent | γ-picoline, Mol. Percent |
|---|---|
| 83 | 17 |

EXAMPLE 7

As an illustration of the effect of slightly warming the treated mixture, 8.7 g. (0.1 mole) of dried lithium bromide and 50 ml. (0.515 mole) of a mixture of beta-picoline and gamma-picoline were added to a 250 ml. stoppered flask. The mixture of lithium bromide and picolines was warmed slightly stirred and allowed to stand for 1 hour. A precipitate was formed and was removed by filtration and washed with 25 ml. n-hexane. The precipitate weighed 30.1 g. Ten ml. of water were added to decompose the complex in the solid precipitate and the water layer was extracted with ether. The ether solution was then dried over potassium hydroxide and distilled to leave the complexed isomer as a 20 ml. residue product. Infrared spectrophotometer analyses of the feed and residue product was as follows:

|  | β-picoline, Mol. Percent | γ-picoline, Mol. Percent |
|---|---|---|
| Feed | 64 | 36 |
| Residue product | 96 | 4 |

EXAMPLE 8

As another illustration, 8.7 g. (0.1 mole) of dried lithium bromide and 50 ml. (0.515 mole) of a mixture of beta-picoline and gamma-picoline were added to a 250 ml. stoppered flask. The mixture of lithium bromide and picolines was warmed slightly stirred and allowed to stand for 1 hour. A precipitate was formed and was removed by filtration and washed with 25 ml. of n-hexane. The precipitate weighed 20.2 g. Ten ml. of water added to decompose the complex is the solid precipitate and the water layer was extracted with ether. The ether solution was then dried over potassium hydroxide and distilled to leave the complexed isomer as a 12 ml. residue product. Infrared spectrophotometer analyses of the feed and residue product are as follows:

|  | β-picoline, Mol. Percent | γ-picoline, Mol. Percent |
|---|---|---|
| Feed | 27 | 67 |
| Residue product | 69 | 30 |

As an illustration of the use of calcium chloride in place of the alkali halide, 5.0 g. of calcium chloride and 50 ml. of a 50–50 mixture of betal-picoline and gammapicoline were added to a 250 ml. stoppered flask. A solid began forming with gradual swelling of the calcium chloride. The mixture of calcium chloride and picolines was stirred and allow to stand overnight. The solid precipitate was removed by filtration. 10 ml. of water was added to decompose the complex in the solid precipitate and the water layer was extracted with ether. The ether solution was then dried over potassium hydroxide and distilled to leave the complexed isomer as a 16 ml. residue product. The filtrate (29 ml.) was distilled under vacuum at room temperature to decompose any complexes remaining in the filtrate and to separate calcium chloride as a bottoms. 28 ml. of distillate were recovered. Infrared spectrophotometer analyses of the feed, residue product and distillate are as follows:

|  | β-picoline, Mol. Percent | γ-picoline, Mol. Percent |
|---|---|---|
| Residue product | 32 | 68 |
| Distillate | 58 | 42 |

β-value for the separation was 0.34.

EXAMPLE 9

As an illustration of lithium chloride as the alkali halide, 5.0 g. of lithium chloride and 50 ml. of a 50–50 mixture of beta-picoline and gamma-picoline were added to a 250 ml. stoppered flask. The mixture of lithium chloride and picolines was stirred and allowed to stand overnight. A precipitate was formed and was removed by filtration. 50 ml. of ether and 12 ml. of water were added to decompose the complex in the solid precipitate and the water layer was extracted with 50 ml. ether. The ether layer was dried over potassium hydroxide and distilled to leave the complexed isomer as a 17 ml. residue product. The filtrate (28 ml.) was distilled under vacuum at room temperature to decompose any complexes remaining in the filtrate and to separate lithium chloride as a bottoms. 27 ml. of distillate were recovered. Infrared spectrophotometer analyses of the feed, residue product and distillate are as follows:

|  | β-picoline, Mol. Percent | γ-picoline, Mol. Percent |
|---|---|---|
| Feed | 49 | 51 |
| Residue Product | 78 | 22 |
| Distillate | 32 | 68 |

β-value for the separation was 7.4.

EXAMPLE 10

As another illustration, 4.3 g. (0.1 mole) of dried lithium chloride and 50 ml. (0.515 mole) of a 50–50 mixture of beta-picoline and gamma-picoline were added to a 250 ml. stoppered flask. The mixture of lithium chloride and picolines was warmed slightly stirred and allowed to stand for 1 hour. A precipitate was formed and was removed by filtration. The precipitate weighted 17.5 g. 10 ml. of water were added to decompose the complex in the solid precipitate and the water layer was extracted with 50 ml. ether. The ether layer was dried over potassium hydroxide and distilled to leave the complexed isomer as a 15 ml. residue product. The filtrate (29 ml.) was distilled under vacuum at room temperature to decompose any complexes remaining in the filtrate and to separate lithium chloride as a bottoms. 28 ml. of distillate were recovered. Infrared spectrophotometer analyses of the feed, residue product and distillate are as follows:

|  | β-picoline, Mol. Percent | γ-picoline, Mol. Percent |
|---|---|---|
| Feed | 49 | 51 |
| Residue product | 87 | 13 |
| Distillate | 30 | 70 |

β-value for the separation was 15.5.

EXAMPLE 11

As an illustration of lithium iodide as the alkali halide, 13.6 g. (0.1 mole) of dried lithium iodide and 50 ml. (0.515 mole) of a 50–50 mixture of beta-picoline and gamma-picoline were added to a 250 ml. stoppered flask. The mixture of lithium iodide and picolines was warmed slightly stirred and allowed to stand for 5 hours. A precipitate was formed and was removed by filtration. 10 ml. of water were added to decompose the complex in the solid precipitate and the water layer was extracted with ether. The ether layer was dried over potassium hydroxide and distilled to leave the complexed isomer as a 10 ml. residue product. The filtrate (38 ml.) was distilled under vacuum at room temperature to decompose any complexes remaining in the filtrate and to separate lithium iodide as a bottoms. 37 ml. of distillate were recovered. Infrared spectrophotometer analyses of the feed, residue product and distillate are as follows:

|  | β-picoline, Mol. Percent | γ-picoline, Mol. Percent |
|---|---|---|
| Feed | 49 | 51 |
| Residue product | 79 | 21 |
| Distillate | 33 | 67 |

β-value for the separation was 7.9.

EXAMPLE 12

As an illustration of the separation of dimethyl pyridine, 8.7 g. of dried lithium bromide and 50 ml. of a mixture of 2,4-, 2,5-, and 3,5-lutidines were added to a 250 ml. stoppered flask. The mixtures of lithium bromide and lutidines was stirred and allowed to stand for 1 hour. A precipitate was formed and was removed by filtration and washed with 150 ml. hexane. 10 ml. of water were added to decompose the complex in the solid precipitate and the water layer was extracted with 50 ml. ether. The ether layer was dried over potassium hydroxide and distilled to leave the complexed isomer as a 10 ml. residue product. The filtrate and hexane washings were distilled to remove hexane and the bottoms from this distillation were then distilled under vacuum at room temperature to decompose any complexes formed and to separate lithium bromide out as a bottoms. 36 ml. of distillate were recovered. Infrared spectrophotometer analysis of the feed, residue product and distillate were as follows:

|  | Lutidine Isomer | | | |
|---|---|---|---|---|
|  | 2.4 | 2.5 | 2.6 | 3.5 |
| Feed | 12 | 25 | 35 | 25 |
| Residue product | 14 | 28 | 40 | 20 |
| Distillate | 5 | 5 | 10 | 80 |

EXAMPLE 13

To illustrate the separation of an isomer of a nitrogen-containing mixture, 8.7 g. of dried lithium bromide and 50 ml. of a mixture of beta-picoline, 2,4-lutidine, 2,5-lutidine and 2,6-lutidine were added to a 250 ml. stoppered flask. The mixture of lithium bromide and picolines was warmed slightly stirred and allowed to stand for 1 hour. A precipitate was formed and was removed by filtration. The precipitate weighed 15.1 g. 10 ml. of water were added to decompose the complex in the solid precipitate and the water layer was extracted with 50 ml. ether. The ether layer was dried over potassium hydroxide and distilled to leave the complexed isomer as a 7 ml. residue product. Infrared spectrophotometer analyses of the feed and residue product were as follows:

|  | β-picoline, Mol percent | Lutidines, Mol percent | | |
|---|---|---|---|---|
|  |  | 2.4 | 2.5 | 2.6 |
| Feed | 40 | 10 | 20 | 30 |
| Residue product | 70 | 5 | 10 | 15 |

EXAMPLE 14

As an illustration of the separation of methylquinoline, 8.7 g. (0.1 mole) of lithium bromide and 54 g. of a 50-50 mixture of 6-methylquinoline and 8-methylquinoline were added to a 250 ml. stoppered flask. The mixture of lithium bromide and methylquinolines was warmed slightly, stirred and allowed to stand for 1 hour. A precipitate was formed and was removed by filtration. 10 ml. of water were added to decompose the complex in the solid precipitate and the water layer was extracted with ether. The ether layer was then dried over potassium hydroxide and distilled to leave the complexed isomer as a 30.8 g. residue product. The filtrate was distilled under vacuum at room temperature to decompose any complexes remaining in the filtrate and to separate lithium bromide as a bottoms. 24.0 g. of distillate were recovered. Infrared spectrophotometer analyses of the feed, residue product and distillate are as follows:

|  | 6-methyl-quinoline, Mol percent | 8-methyl-quinoline, Mol percent |
|---|---|---|
| Feed | 50 | 50 |
| Residue product | 87 | 13 |
| Distillate | 35 | 65 |

β-value for the separation was 12.3.

Examples 1, 9 and 11 demonstrate various alkali halides in our separation process. Examples 4 and 6 through 8 demonstrate that the separating is obtained under various temperature conditions; heating apparently decreases total yield and purity of product while at lower temperatures, yield and purity are slightly increased. Increased contact time, as demonstrated by Examples 4 and 5, increases total yield, but not sufficiently to warrant use of extended periods of contact time. As is evident from Examples 1, 12 and 14, isomers of various nitrogen-containing organic heterocyclic amino compounds have been separated and such isomers have also been separated (Example 13) from other nitrogen-containing organic heterocyclic compounds.

In addition to the above examples, we have carried out further experiments with the complexing method of this invention and the complexed isomers formed thereby. We have found that while in some instances water or another solvent is necessary to separate the complexed isomers and may be employed during the treating of the isomers with the inorganic alkali halide, neither causes water of contents to inhibit formation of the complexes, particularly when working with picolines and lutidines. It is preferred that in such cases that the inorganic alkali halide be substantially anhydrous.

We have further found that isomers may be screened to determine the best method for their separation in a simple lab experiment which may be used to determine operable separations by simple experimentation. Accordingly, a pure isomer of a compound or mixture of isomers is contacted with lithium bromide and allowed to settle. Formation of a substantial amount of solid precipitate is indicative that lithium bromide is forming a solid complex with the pure isomer or at least one isomer in the mixture, which complex is insoluble in the presence of the mixture of isomers. If no precipitate is formed various solvents, such as benzene, toluene, xylene-heptane mixtures, are added to precipitate a complex, or the complex or mixture of complexes etc., is subjected to azeotropic or fractional distillation to effect separation. Accordingly, the isomers of compounds listed below in Table 2 were each contacted in 20 ml. amounts with 3 g. of lithium bromide with the results shown in Table 2.

*Table 2*

| Isomer | Result |
|---|---|
| 2-benzyl pyridine | No solid complex (LiBr insoluble) |
| 4-benzyl pyridine | Solid complex formed. |
| 4-methylquinoline (Lepidine) | Do. |
| 6-methylquinoline | Do. |
| 7-methylquinoline | No solid complex. |
| 8-methylquinoline | Do. |

It can be readily be seen from the data reported in Table 2 that either 4-methyl or 6-methyl quinoline may be separated from 7-methyl quinoline or 8-methyl quinoline by the addition of dried lithium bromide. In like manner 4-benzyl pyridine may be separated as a solid precipitate from 2-benzyl pyridine.

Further, the separations in accordance with this invention may also be carried out in the vapor phase. Accordingly 50 ml. of the feed mixture of beta- and gamma-picoline indicated in Table 3 were added to a flask, at room temperature while stirring with an applied vacuum of 0.4 mm. Hg. The picoline mixture was vaporized and the vapor was drawn through a bed of lithium bromide (12.5 g.) and was collected in a vacuum trap until a total of 1 ml. was collected for analyses. Infrared analyses of the feed and liquid collected in the trap are reported in Table 3.

*Table 3*

| | β-picoline, Mol. Percent | γ-picoline, Mol. Percent |
| --- | --- | --- |
| Feed | 44 | 56 |
| Liquid collected in trap | 20 | 80 |

It can be seen by the data of Table 3 that the gamma isomer prevailed in the liquid collected in the vacuum trap indicating that the beta isomer had formed a solid complex with the lithium bromide and had been retained in the lithium bromide bed and separated from admixture with other isomers.

The quantity of complexed isomer is apparently dependent upon the concentration of inorganic alkali halide in the complexing mixture as is indicated by a comparison of Examples 3 and 5 with regard to the amounts of beta-picoline and gamma-picoline respectively found in the residue product. In Example 3 where .05 mole of lithium bromide were used to form complexes with .515 mole of picoline, only .144 mole of picoline complexed with the lithium bromide and the residue product contained 75% beta-picoline and 23% gamma-picoline. In contrast in Example 5 where .10 mole of lithium bromide were mixed with .515 mole of picoline, .216 mole of picoline were complexed and the precipitate and extracted solid complex contained 81 mole percent of beta-picoline and 19 mole percent of gamma-picoline. Therefore, increasing the concentration of the lithium bromide in the separation process also increased the amount of complexed isomer. We have found that generally the mole ratio of picoline to alkali halide in the complex is about 2:1, as will be more particularly explained hereinbelow, and this mole ratio remains approximately the same regardless of whether or not excess alkali halide is used.

Examples 5, 7, and 8 and the data reported thereon in Table 1 point out that the extent to which the complexed picolines will be rich in the beta-picoline isomer further depends upon the concentration of the beta-picoline isomer in the feed mixture. Thus, as pointed out above, the lithium bromide in Example 5 complexed .216 mole of picoline in the 50-50 mixture giving a final product containing 81 mole percent beta-picoline and 19 mole percent gamma-picoline.

The concentration of beta-picoline isomer in the feed mixture also affects the amount of complexed picoline separated. When the concentration of the beta-picoline is the same as or greater than the concentration of the gamma-picoline, the mole ratio of picoline to solid in the complex is usually about 2. When the concentration of the beta-picoline is lower the mole ratio is less than 2. Although we do not wish to be held to any theories regarding the complex formation, it is believed that complex formation is an equilibrium process represented by the following equation:

$$LiBr2(\beta\text{-picoline}) + \gamma\text{-picoline} \rightleftharpoons LiBr.(\beta\text{-picoline})\cdot(\gamma\text{-picoline}) + (\beta\text{-picoline})$$

Introduction of the gamma-picoline isomer into the complex increases its solubility in the excess gamma-picoline so that all of the alkali halide is not in the precipitate complex.

In further experimentation, two addition examples were run and demonstrate two methods of decomposing the solid complex. In both experiments the solid complex was formed by contacting 8.7 g. (1.0 mole) of lithium bromide with 50 ml. (.515 mole) of a 50-50 mixture of beta- and gamma-picoline isomers the process was carried out as in Example 4 above except that in one experiment the solid precipitate was decomposed by heating in a vacuum to 250-350° C. under one mm. mercury pressure. The results from this experiment indicated that in both cases of decomposition the methyl pyridine in the complex was exactly the same, i.e. 0.202 mole percent and the analysis of the product give essentially the same amounts of beta- and gamma-picolines, i.e. 80 mole percent beta- and 20 mole percent gamma-picoline for water decomposition and 79 mole percent beta- and 21 mole percent gamma-picoline for decomposition by heating.

The formation of complexes with the inorganic alkali halide gives the various isomers sufficiently different physical properties for separation by conventional means such as distillation point differences, melting point differences, solubility differences and differences in azeotroping ability. In order to illustrate the separability of the complexes with particular isomers, the complexes formed in one particular separation were studied. Accordingly, complexes of lithium bromide with alpha-picoline, beta-picoline and gamma-picoline were studied. It was found that the lithium bromide actually formed complexes with all three of the isomers but that only the beta-picoline isomer was insoluble in the mother liquor. The mother liquor was decanted and the complexes with alpha-picoline and gamma-picoline were isolated from the mother liquor by driving off the uncomplexed picolines which boil below the decomposition point of the alpha-picoline and gamma-picoline complexes. Each of the complexes contained two moles of the pyridine base per mole of lithium bromide.

Differential analysis graphs were obtained on the gamma-picoline and beta-picoline complexes with lithium bromide at a mole ratio of 2:1. Further it was found that both beta- and gamma-picoline had boiling points of about 144° C. The thermal analysis graphs revealed that both complexes decomposed at above about 168° C. and that the beta-picoline complex melted just prior to decomposition while the gamma-picoline complex melted at about 66° C. Further, it was determined that the gamma-picoline complex was soluble in gamma-picoline and beta-picoline while the beta-picoline complex was insoluble in this medium. Thus, the particular complex may be separated by utilizing at least one of their differing physical properties. Accordingly, beta-picoline may be separated from either gamma-picoline or alpha-picoline or both by treating a mixture of the isomers with lithium bromide at a temperature below 168° C., the decomposition temperature of the complexes formed. For example, in separating beta-picoline from gamma-picoline, a mixture of the two isomers is treated with lithium bromide and the resulting solid beta-picoline lithium bromide complex is removed from the mother liquor such as by filtration. The remaining mother liquor is heated to about 144° C. to drive off any uncomplexed beta-picoline and gamma-picoline. Heating of the mother liquor is continued above the decomposition temperature of the complexes remaining in the mother liquor, i.e. above about 168° C., and the complexes are thereby decomposed and an overhead fraction is taken immediately from the decomposition which fraction is relatively rich in gamma-picoline. The only beta-picoline which is present in this overhead fraction is the beta-picoline from the very small amount of beta-picoline lithium bromide complex which was soluble in the mother liquor. The solid beta-picoline lithium bromide complex which has been removed from the mother liquor is then decomposed by contacting with water or by heating above the decomposition temperature, i.e., about 168° C. and a relatively rich fraction of beta-picoline is recovered. When the beta-picoline complexes are decomposed by heating, the relatively rich beta-picoline fraction may be obtained directly from the heating as a distillate. The lithium bromide remaining after decomposition of the complexes is recycled to treat additional mixed isomer feeds with make-up lithium bromide added when necessary. In this way a continuous process for the separation of the isomers is provided.

Using the separation method of this invention, valuable substantially pure isomers may be obtained from admixture with other isomers. Although most of the examples above used mixtures containing about equal volumes of isomers to be separated, the process is not limited to such mixtures. Mixtures containing varying amounts of isomers can be separated. If greater purity of the extracted isomer is desired than can be obtained with one separation, one or more additional separation steps can be effected, each additional separation step using the product from prior separation as the feed. Such additional separation steps preferably use the method of this invention. Thus, the mixture of isomers may be separated so as to obtain the extracted isomer in substantially pure form by employing a multi-stage separation utilizing the method of this invention in one or more stages.

From the above descriptions and illustrations, it is evident that we have provided a method of separating isomers by treating mixtures of such isomers with an inorganic alkali halide as hereinabove provided.

We claim:

1. The method for the selective separation of β-picoline from a mixture of β-picoline with gamma picoline which method comprises treating said mixture in the liquid phase with an inorganic alkali halide selected from the class consisting of LiBr, LiI and LiCl, at a temperature below the decomposition temperature of the β-picoline-alkali halide complexes formed by said treating and separating the resulting complexes.

2. A process for separating β-picoline from a liquid mixture of β-picoline and an isomer thereof selected from α-picoline and γ-picoline which process comprises treating said mixture in the liquid state with an inorganic alkali halide selected from the class consisting of lithium chloride, lithium iodide, and lithium bromide, whereby a solid β-picoline-inorganic alkali halide complex is formed, separating said solid complex from said liquid mixture, heating separated solid complex to its decomposition temperature and recovering the overhead as separated β-picoline.

3. A continuous process for separating β-picoline and an isomer thereof from a liquid mixture of β-picoline and said isomer thereof which process comprises treating said mixture with from about one-tenth to about one-half mole of lithium bromide per mole of said picolines in the liquid phase at a temperature below about 168° C. whereby a solid β-picoline-lithium bromide complex is formed and a soluble complex of lithium bromide is formed with said isomer, separating said solid complex from said liquid mixture, decomposing the separated complex at a temperature of about 168° C., recovering an overhead from said decomposing step comprising a β-picoline rich fraction, recycling the bottoms residue from said decomposing step as lithium bromide to said treating step, heating said liquid mixture to a temperature in the range of from 140° C. to 175° C. to distill off β-picoline and said isomer and to a temperature of at least about 168° to decompose said soluble complex and recovering a second overhead fraction rich in said isomer and a second bottoms residue comprising lithium bromide, and recycling said second bottoms residue to said treating step.

4. An inorganic lithium halide complex with an isomer of a compound selected from the class consisting of methyl pyridine, dimethyl pyridine, benzyl pyridine and methyl quinoline, containing about 2 moles of inorganic lithium halide per mole of said isomer.

References Cited in the file of this patent

UNITED STATES PATENTS

| | | |
|---|---|---|
| 2,336,502 | Reimers | Dec. 14, 1943 |
| 2,391,270 | Reimers | Dec. 18, 1945 |